United States Patent [19]
Mannick

[11] Patent Number: 6,113,041
[45] Date of Patent: Sep. 5, 2000

[54] VIDEO WALL FRAMING SYSTEM

[75] Inventor: Louis A. Mannick, San Pedro, Calif.

[73] Assignee: ADF, Incorporated, San Pedro, Calif.

[21] Appl. No.: 09/399,253

[22] Filed: Sep. 20, 1999

Related U.S. Application Data

[63] Continuation of application No. 08/902,386, Jul. 29, 1997
[60] Provisional application No. 60/022,768, Jul. 30, 1996.

[51] Int. Cl.[7] ............................. F16M 11/00; H04N 5/72; H04N 5/64
[52] U.S. Cl. .......................... 248/201; 348/786; 348/789
[58] Field of Search ..................................... 248/201, 202, 248/188.2, 649; 348/825, 826, 840, 778, 786, 787, 789; 188/32

*Primary Examiner*—Anita M. King
*Assistant Examiner*—Michael Nornberg
*Attorney, Agent, or Firm*—Stetina Brunda Garred & Brucker

[57] ABSTRACT

A video display screen is held by an elongated holding bracket that has a inwardly extending flange at a distal end of the bracket. The flange fits into a groove extending along the edges of the screen to hold the screen. The bracket is fastened to a support structure. The interior surface of the bracket is advantageously inclined at an angle so the interior surface does not block the light from the projected image, and also has a plurality of grooves to reflect any light incident on the surface away from the screen. In further embodiments, the flange comprises a removable channel section that extends on opposing sides of the screen to hold the screen, with the channel being held against the bracket by a leaf spring.

5 Claims, 9 Drawing Sheets

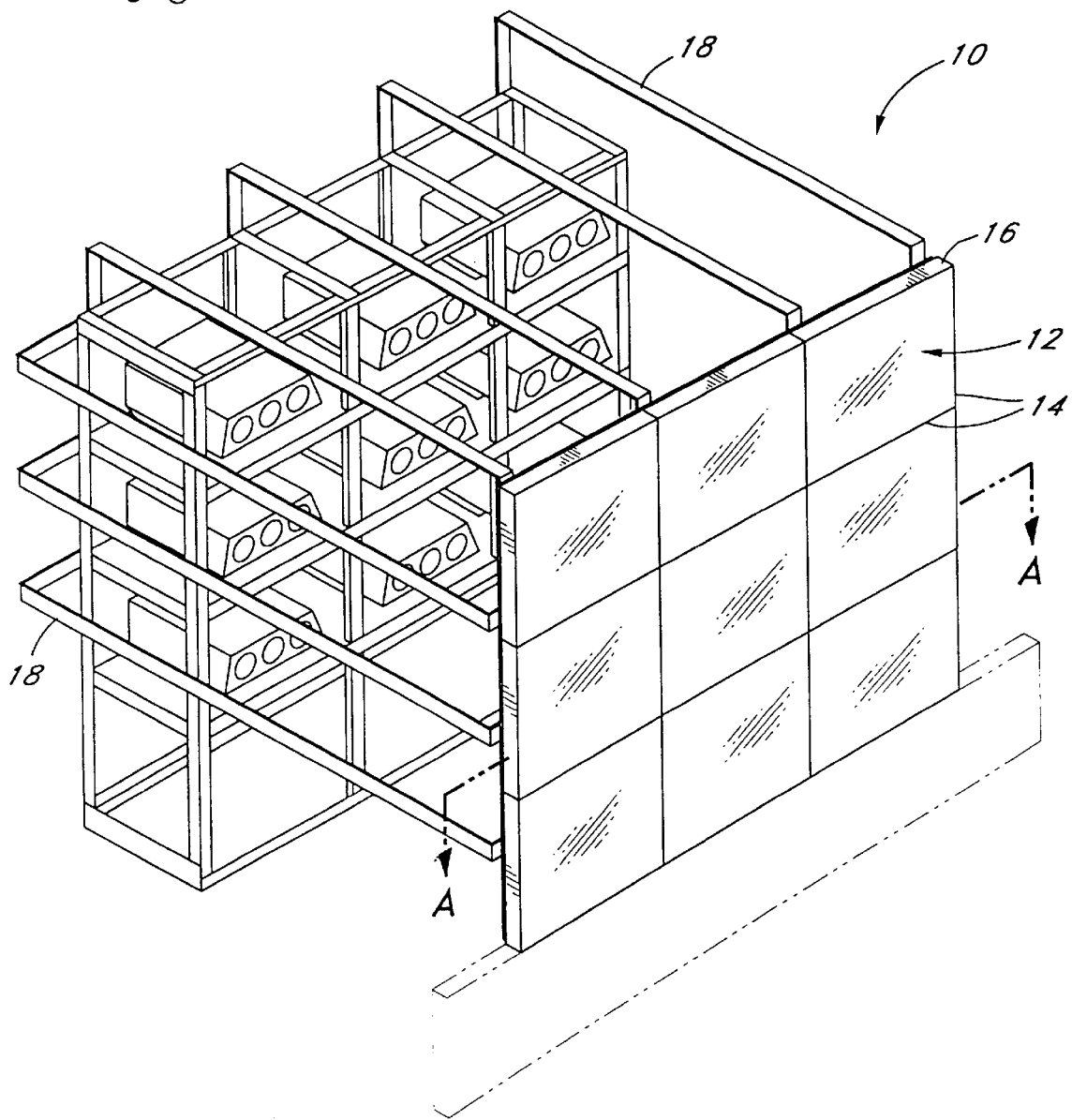

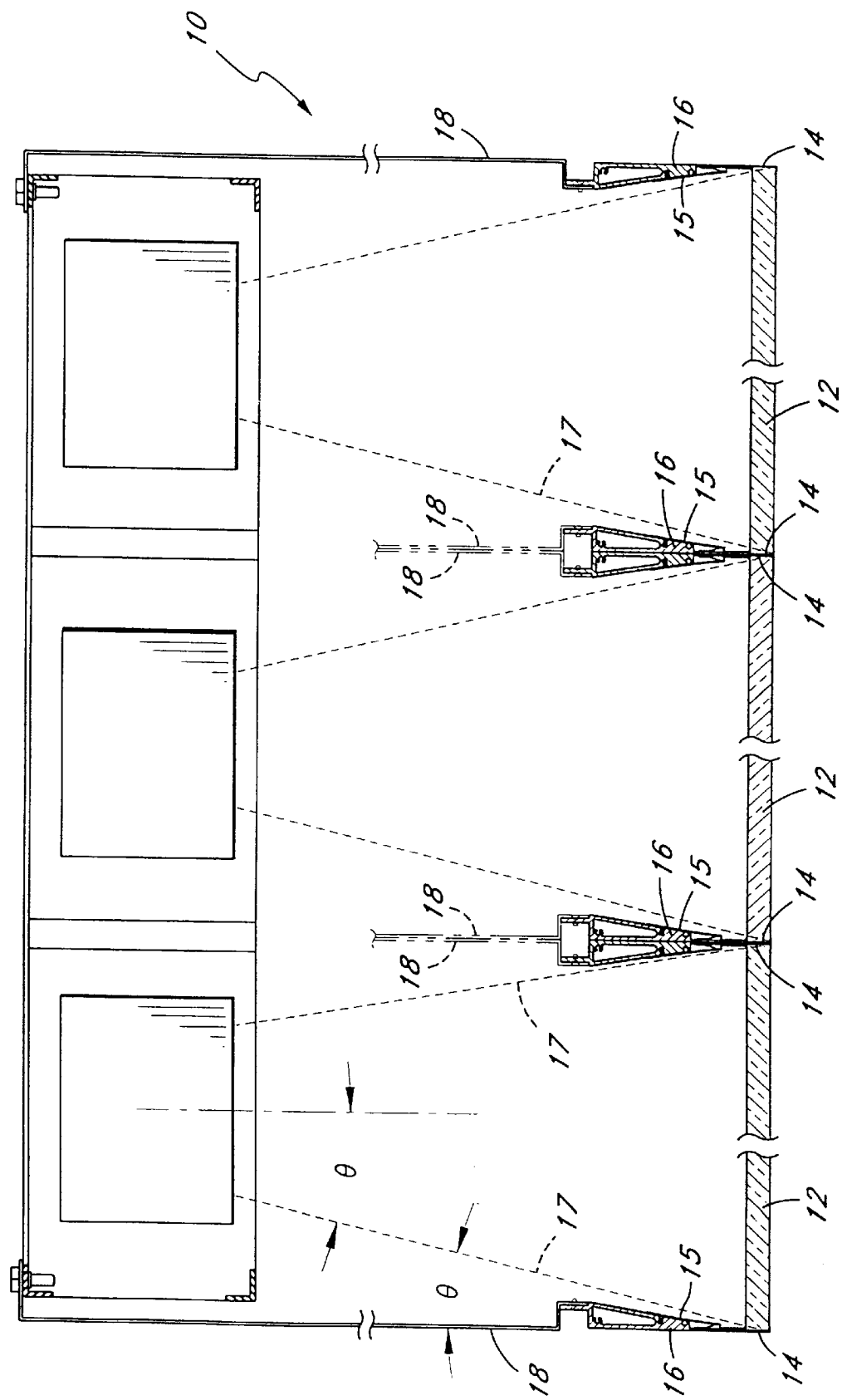

VIDEO WALL FRAMING SYSTEM

This application is a continuation of application Ser. No. 08/902,386 filed Jul. 29, 1997, which is a continuation of Provisional Application, Serial No. 60/022,768 filed Jul. 30, 1996.

BACKGROUND OF THE INVENTION

The present invention generally relates to video walls and, more particularly, is concerned with a method and apparatus for supporting and connecting the individual screen panels comprising a multiple screen panel video display wall.

In recent years, there has been an increase in the overall dimensions of large screen video walls. Large video walls are often designed for information display purposes, including command and control centers, sports venues, and the entertainment industry. The video wall is commonly comprised of several smaller rear projection screen panels. Each panel of the video wall then receives a portion of the overall picture resulting in an enlarged total image.

The screen panels are combined in any gridded configuration. Typically, the screens are held in place by integral frame members which must support the weight of each screen to prevent warpage of the lower screens. Because the integral frame members are usually supported on their ends, the integral frame members are relatively wide to prevent bowing and sagging in the span. The width creates a relatively large line or grid pattern in the overall video presentation. In the past, a metal framework provided the necessary support to the panels. Each screen panel edge was held by individual metal components that created an opaque border around the periphery of the screen panel.

While this support system was used extensively in the past, it has serious drawbacks. Due to the need to support each screen individually, the screen was supported by a bracketing system. The bracketing system was made of a non-translucent material, such as metal or wood, and, as a result, it obstructed the path of light between the projector and the screen surface. The bracketing system also allowed the reflection of stray light into the screen display area since the bracketing system was not capable of diffusing light. In addition, in order to hold each screen panel, a support member attached to the front of the screen. The support members created a grid-like formation over the viewing surface.

Consequently, a need exists for improvements in the framing system for video walls which will reduce the grid-like formation over the viewing screen while supporting each individual panel.

SUMMARY OF THE INVENTION

The current invention makes possible the creation of a video wall support system resulting in optimal continuity of the viewing surface from screen panel to screen panel. Due to an innovative means of gripping and enclosing the edges of the individual panels, the present invention obscures less than 2–3 mm of the screen panel along each panel edge, and in some embodiments can eliminate all obstructions. In addition, exposed supports in the form of c-clips, are molded of clear plastic which creates a less obtrusive joint compared to the opaque prior art joints. The supporting bracket for the joint is tapered from the end attached to the supporting frame to the narrower end nearest to the video screen panel. The tapering allows the light from the projector to strike the screen unimpeded. This also substantially lessens the dead space between the individual projected images on each screen.

Accordingly, the present invention relates to a method and apparatus for supporting individual video screen panels while creating an enlarged overall video presentation with minimal obstruction. Each video panel is framed by a small, clear plastic, c-shaped clip. In an alternative embodiment, each panel is notched and held to a supporting bracket by a thin piece of mylar tape.

The c-clips snap into an extruded black-anodized aluminum supporting bracket. The supporting bracket is tapered, increasing in thickness from the c-clip end backwards toward the end attached to the support structure.

In further embodiments, the screen panel has a groove around its periphery with a notched interior surface, so that a bracket with a flange directed parallel to the surface of the screen panel can form a tongue-in-groove connection with the grooves. This connection provides a low-profile connection that reduces blockage of the light from the projection, and thus reduces or eliminates the light obstruction. The interior surface of the brackets on which the flange is formed are advantageously grooved so that any incident light is not reflected onto the screen panel.

The supporting bracket utilizes a flange to attach to the wood or metal support structure. In addition, the extrusion is shaped to diffuse any stray light present to avoid reflections into the display area. The result is a support system which supports each individual panel with members that do not interfere with the light path. Also, the support system provides a very small non-imaged space between video screen panels. The present invention thereby creates a more efficient structure and a more continuous overall image.

The extrusion of this invention comprises an elongated holding bracket having a substantially uniform cross-sectional shape along substantially the entire length of the bracket. The cross-sectional shape has a thicker first end and a smaller second end connected by an interior and exterior sides that generally converge at an angle of about θ or less, where θ is the angle at which the image is projected onto the screen. The cross-sectional shape has a mounting surface for connecting the bracket to a support structure. The second end has a flange that extends inward a distance selected to minimize blockage of the projected image, and advantageously extends inward a distance selected to completely avoid blocking the image projected on the screen. Advantageously, the extrusion has an aperture sized to receive a threaded fastener with threads having a pitch, where the aperture includes at least one of an elongated slot in the interior surface extending the length of the bracket and having opposing walls that contain a plurality of grooves spaced apart by the pitch, or a hollow aperture extending the length of the bracket sized to engage the threaded fastener.

In use, the extruded bracket cooperates with a screen having a plurality of edges with a groove extending along the length of each edge. The screen also has an interior side facing the projector with a notched portion along the length of the grooved edges. The notch and groove cooperate with the flange on the extrusion to form a tongue-in-groove connection to hold the grooved edges of the screen.

In a further embodiment, there is provided an apparatus for holding a video display screen onto which an image is projected by a projector, where the screen having a plurality of edges. The apparatus includes a plurality of elongated holding brackets having a substantially uniform cross-sectional shape with a thicker first end and a smaller second end. At least some of the brackets have a mounting surface for connecting to a support structure. The cross-sectional shape has an exterior side and an interior side that converge at an angle selected to reduce, and preferably to avoid blocking the image from the projector. Fastening means connect to the second end to engage an adjacent edge of the screen, with the brackets being placed on a plurality of the plurality of edges of the screen to hold the screen in position. The fastening means can comprise means for engaging grooves in a plurality of edges of the screen to hold the grooved edges of the screen.

In a further embodiment the bracket has a distal end configured to hold an adjacent edge of the screen from movement in at least one direction, where brackets are placed around the periphery of the screen to hold the screen in position. The distal end in one embodiment extends substantially parallel to one side of the bracket and cooperates with a notch in the adjacent edge of the screen to hold the screen. In a further embodiment, the distal end comprises at least one flange extending inward to hold the screen with the inwardly extending dimension of the flange being selected to reduce, and more advantageously to minimize blocking the image projected on the screen, and advantageously to avoid blockage entirely. In yet another embodiment the distal end comprises a pair of flanges on opposing sides of the screen to hold the screen between the flanges. In yet another embodiment the distal end comprises a flange extending inward to hold the screen, where the flange cooperates with a groove in the adjacent edge of the screen to form a tongue-in-groove connection with the screen.

There is also provided a method of holding a display screen onto which an image is projected from a light source. That method includes the step of placing a notch along an edge of the screen and forming a groove in the edge of the screen at the end of the notch that is interior to the screen. A support bracket is formed with a distal end that has a flange thereon extending inward and configured to engage the notch and groove, with the flange being placed into the notch and groove. The bracket is fastened to a support structure. Advantageously, the depth of the groove is selected so that it blocks or distorts a minimal amount of the light from the projector, and advantageously the depth is selected so it does not block light from the image projected onto the screen. Further, an interior surface on the bracket is formed so it is inclined at an angle of about θ or smaller so the interior surface does not block the light from the projected image.

The method also includes forming a plurality of grooves on the interior surface to reflect any light incident on the surface away from the screen. In further embodiments, the notch may be removed, with the distal end of the bracket having a flange thereon extending inward and configured to engage the groove by placing the flange into the groove to hold the screen. Advantageously, there is a groove in each edge of each side of the screen, and a corresponding bracket and flange engaging each groove, the brackets being joined to form a frame around the screen, each of the brackets being fastened to an adjacent support structure.

There is also provided a method of making a holder for a display screen onto which an image is projected from a light source that diverges toward the screen. This method includes the steps of extruding an elongated bracket having an interior surface and an exterior surface orientated at an angle to each other that is selected to reduce blockage of the light from the projected image, and is advantageously selected to avoid such blockage. A support mounting portion is formed to connect the bracket to a structural support. A distal portion of the first end is extruded to form a flange configured to engage an aperture in the edge of the screen to hold the screen.

BRIEF DESCRIPTION OF THE DRAWINGS

The present invention will be better understood from the detailed description which is given below, taken in conjunction with the drawings (like reference characters or numbers refer to like parts throughout the description), and in which:

FIG. 1 is an isometric view of an illustrative support system assembly;

FIG. 1a is a view of cross-section A—A of the support system assembly;

DETAILED DESCRIPTION OF THE PREFERRED EMBODIMENT

Figure 2:
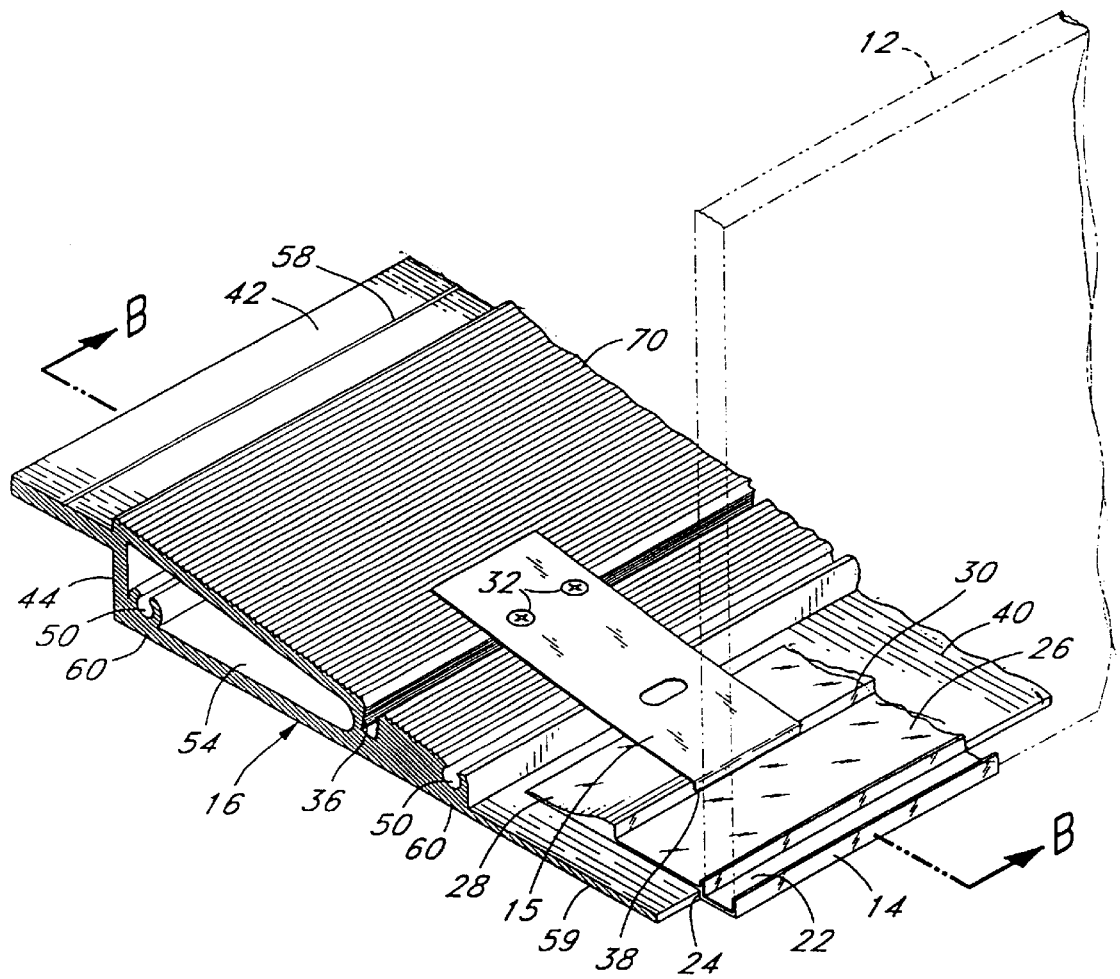
FIGS. 2 and 2A are isometric views of the video screen panel, c-clip and supporting bracket with a spring leaf attached.

FIGS. 1 and 1a show a video screen mounting system 10. The video screen mounting system includes video screen panel 12, c-clip 14, leaf spring 15, supporting bracket 16 and conventional support structure 18. The conventional support structure comprises the projector shelving and ties to the video screen panel supporting brackets 16.

Referring to FIGS. 1–4, each edge of a screen panel 12 is held by a c-clip 14. The c-clip 14 fits over each of the four edges of the screen panel 12 to create a frame-like structure as shown in FIG. 1. The c-clip 14 is an extrusion preferably made of a clear plastic material. Preferably, the c-clip 14 extends along the entire periphery of each panel 12. The length of the c-clip 14 is, therefore, about the same length as the edge of the video screen panel 12 which is being supported.

Figure 3:
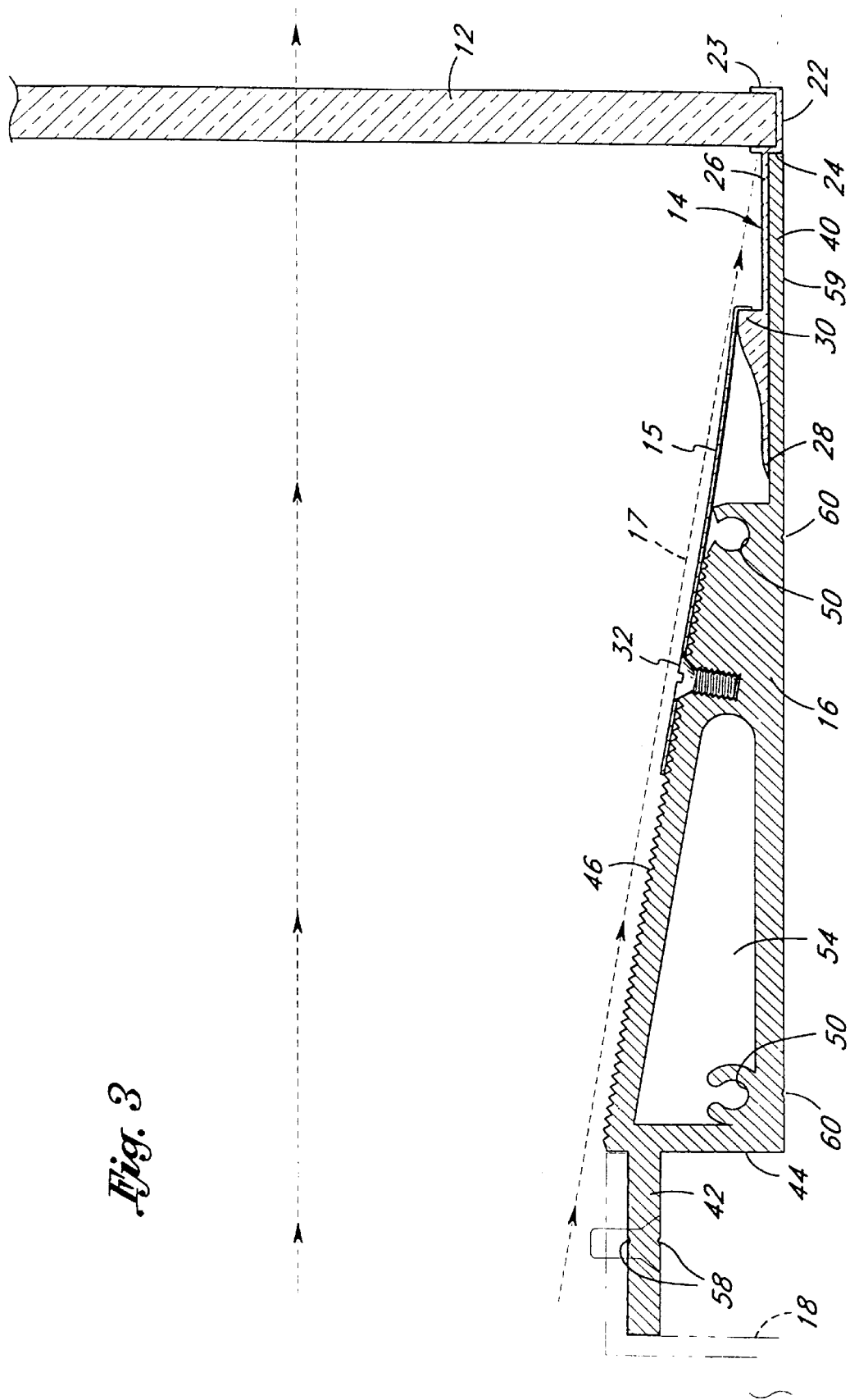
FIG. 3 is a view of cross-section B—B of FIG. 2.
Figure 4:
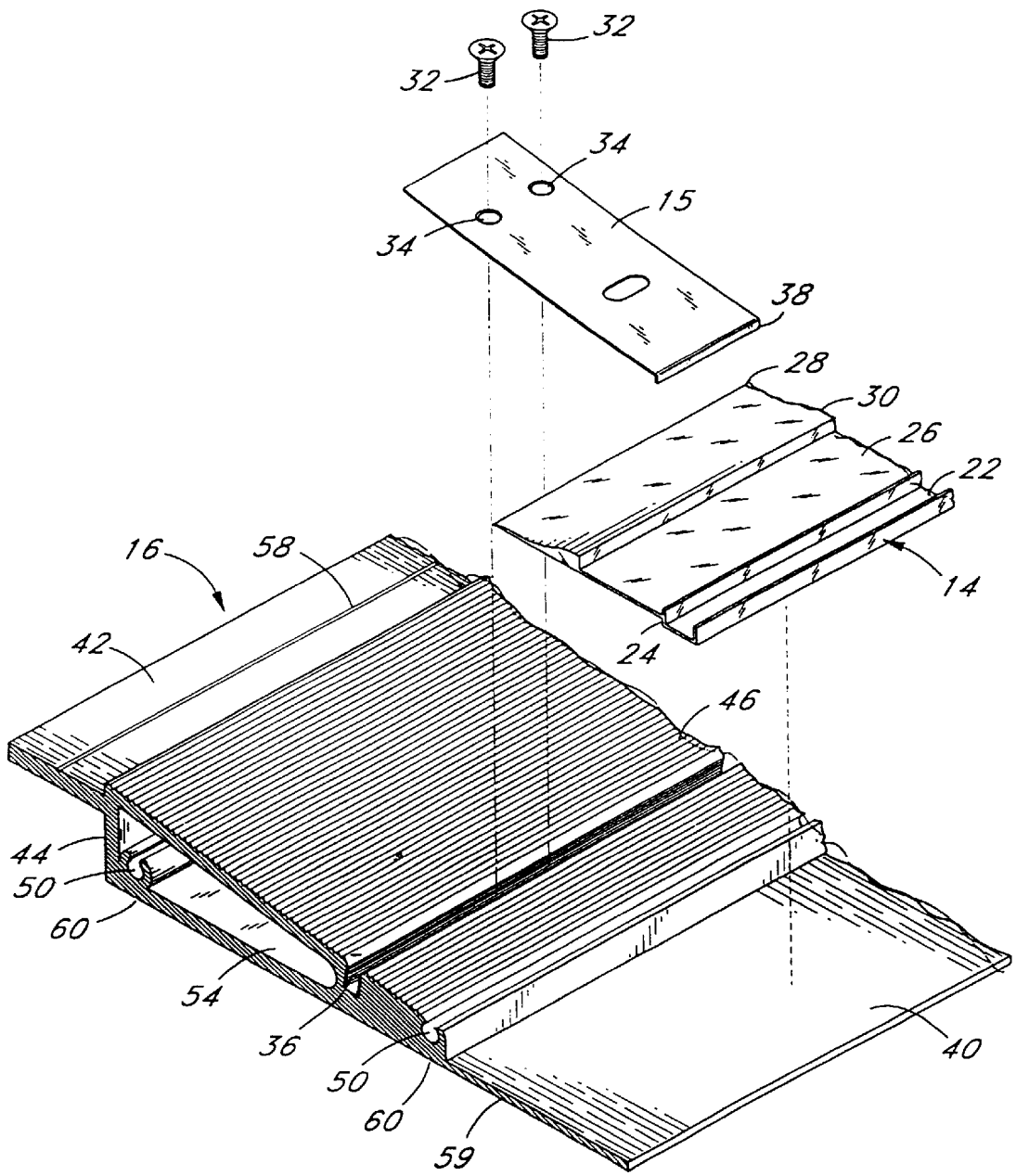
FIG. 4 is an exploded isometric view of FIG. 2.

Referring to FIGS. 3 and 4, the c-clip 14 is comprised of a c-shaped channel 22 with opposing flanges or legs 23, 24 (FIG. 3). The c-clip 14 is attached on one leg 24 to a c-clip flange 26. The distal flange or leg 23 extends inward so the edge of screen panel 12 is held between flanges or legs 23, 24. The c-clip flange 26 is offset from the c-shaped channel 22 such that the base surface 59 of the supporting bracket 16 is flush with the bottom of the exterior or outside surface of the c-shaped channel 22 upon assembly (FIG. 3). As used herein, the inside or interior refers to the portion of the bracket 16 that faces the incident light 17 and that encloses the screen panel 12. The outside or exterior refers to the portion of the bracket 17 that faces away from the incident light 17, or that is outside the screen panel 12. The inside dimension of the c-shaped channel 22 is about the same as the thickness of the video screen panel 12. In the embodiment, the inside dimension of the c-shaped channel 22 is about 0.1875 inch (4.8 mm). The c-clip flange 26 is preferably about 1.5 inches wide and about 0.0625 inch thick. The end of the c-clip flange 26 opposite the c-shaped channel 22 has a tapered lip 28 ending in an engaging portion such as interior ridge 30. The thickness of the c-clip flange 26 at the ridge 30 is preferably about 0.1875 inch and tapers to a point at the end of the c-clip flange 26 opposite channel 22.

Due to the clear plastic construction, the c-clip 14 reduces interference with the projection of light 17 from a projector. The clear plastic construction also helps to reduce the grid-line support inherent in the prior art.

Referring to FIGS. 2–4, the leaf spring 15 is made of a resilient yet stiff material, preferably spring steel coated with a textured, black powder-coated material. Leaf spring 15 is preferably about 1.25 inches wide and about 2.4 inches long, and made of 16 gauge steel. A plurality of threaded fasteners 32, preferably two, hold each leaf spring 15 in place on the supporting bracket 16. The plurality of threaded fasteners 32 run through a corresponding plurality of holes 34 in the leaf spring 15 and attach to the support bracket 16 in a ribbed slot 36 (further discussed below). The distal end of the leaf spring 15 is bent at substantially a right angle providing a short leg 38 which is used to snap over the and engage the engaging portion or ridge 30 of the c-clip 14. The short leg 38 is about 0.125 inch long in the preferred embodiment, but can vary depending on the design of c-clip 14 and its ridge 30.

The supporting bracket 16 is made of a light yet rigid material, preferably of extruded aluminum that is black anodized to reduce reflectance of light 17. The length of the supporting bracket 16 is determined by the edge dimensions of the video screen panel 12 which it encloses and supports. The supporting bracket 16 is substantially wedge-like in cross-sectional shape or generally triangular, resembling a right triangle with the sloping face 46 forming the hypotenuse of the triangle. The wedge-like shape results in a short side 44, a longer base surface 59 and a sloping face 46. In addition, the supporting bracket has flanges which protrude from opposing ends, both of which are discussed in detail below. The angle between the sloping face 46 and the base surface 59 is about 10° for the depicted embodiment. The light 17 projected by the projector, as shown in FIGS. 1 and 1a, commonly has an angle θ of about 10° or greater. The precise angle will vary in order to provide support while avoiding projected light 17 striking the bracket 16. Thus, the angle of convergence between the faces 46 and base 59 is about θ or less. The short side 44 and the base surface 59 are substantially flat. The sloping face 46 of the supporting bracket 16 has a grooved surface. The grooves are preferably 0.03125 inch deep and 0.0625 inch peak-to-peak and run the length of any particular supporting bracket. The grooves are preferably uniformly spaced.

Through the uniform grooves on the sloping face 46 of the supporting bracket 16 and the textured black powder coating on the leaf spring 15, any incident projected light 17 is diffused instead of reflected. While the difference in the slopes of the supporting bracket 16 and the light path 17 allows for a video screen mounting system which does not interfere with the path of projection, the overall structural design also provides a baffling effect between the individual video screen panels 12. The baffle eliminates any image overlap. The integration of the baffle and the angular design of the support structure results in a more efficient framing structure which both separates and supports the individual video screen panels.

The supporting bracket 16 has two circular grooves 50 which run the length of the supporting bracket. The two circular grooves 50 can be located as needed in the supporting bracket 16, but they are preferably located at opposing ends of the extrusion cross-section. As illustrated, the first circular groove 50 is located in the corner formed by the short side 44 and the base surface 59 of the supporting bracket 16. The second circular groove 50 is located near the point of intersection of the sloping face 46 and the base surface 59 of the supporting bracket 16. The circular grooves provide a receptor for self-tapping threaded fasteners (not shown). The threaded fasteners are used to attach four individual supporting brackets together to form a frame enclosing and supporting screen 12 as shown in FIG. 1. Preferably, the ends of the supporting brackets are miter cut to form the corners of the frame; however, other suitable means of forming a corner may be used.

To aid in the formation of a frame of supporting brackets 16, the centerlines of the circular grooves 50 are marked or otherwise indicated on the exterior surface of the supporting bracket 16. In the preferred embodiment, centerline grooves 60 are formed on the base surface 59, by scoring, or forming a slight indentation or groove in the extruded supporting bracket 16 corresponding to the location of the circular grooves 50. The centerline grooves 70 advantageously extend the length of supporting bracket 16.

The supporting bracket 16 also has a ribbed slot 36 of a size corresponding to that of threaded fastener 32. The ribbed slot 36 is located on the sloping face 46 preferably about 2 inches down the face of the slope from the short side 44 of the supporting bracket 16. The ribbed slot 36 runs the length of any particular supporting bracket 16, and is advantageously extruded with bracket 16. The ribbed slot 36 contains a plurality of ridges or ribs that advantageously correspond to the number of threads on fastener 32, to engage fastener 32.

The ribbed slot 36 is located relative to the leaf spring 15 so that the short leg 38 of the leaf spring 15 will properly attach to the engaging portion or ridge 30 of the c-clip 14. The leaf spring 15 is attached with threaded fasteners 32, thus the ribbed slot replaces pre-drilled holes. The slot 36 allows for two threaded fasteners 32 to attach the leaf spring 15 to the supporting bracket 16 at any position along its length. For the illustrated embodiment, the leaf spring 15 is attached to the supporting bracket 16 about every six inches, but the spacing can vary with the particular structural design and needs.

To reduce unnecessary material and weight, a cut-out or hollow portion 54 exists in the middle section of the extrusion creating an overall shape of a hollow wedge. The cut-out 54 results in a wall thickness of about 0.125 inch throughout the main body of the supporting bracket. The cut-out 54 runs the length of any particular supporting bracket. The wall thickness can vary to meet structural needs.

An attachment flange 42 extends from the short side 44 of the supporting bracket 16 in a plane parallel to the base surface 59. Flange 42 is about 0.125 inch thick and located about 0.5 inch from the base surface 59, but the particular size and location can be varied as needed. The attachment flange 42 has a shallow indicator groove 58 (FIG. 2) located on both sides of the attachment flange 42. Indicator groove 58 runs the length of bracket 16 and preferably divides the surface of the attachment flange 42 into two substantially equal portions. The indicator groove 58 aids assembly of the support bracket 16 to the conventional support structure 16 by indicating the center of the attachment flange 42.

The attachment flange 42 is provided to attach the supporting bracket 16 to a support structure 18 (FIG. 1). The support structure 18 is typically a wood or metal frame which holds the projectors and the video screen and maintains the appropriate distance between the video screen and the projectors. As a result of the attachment flange 42 extending the full length of the supporting bracket 16, the frame 18 may advantageously be supported along its entire span and not just at the ends or intersections of each panel 12.

A c-clip support flange 40 extends in a plane parallel to the base surface 59 from the point of the wedge-shaped bracket 16 opposite of the short side 44 of the bracket 16. Preferably, the c-clip support flange 40 is an extension of the base surface 59 and extruded as part of bracket 16. The support flange 40 provides a supporting surface for the attachment of the c-clip 14. The flange 40 tapers such that it is narrowest at its distal end. The width of the c-clip supporting flange 40 is determined in part by the width of the c-clip flange 26, but is about 1.5625 inches in the illustrated embodiment.

When combined with the features of the supporting bracket 16, including the c-clip support flange, the leaf spring 15 holds the c-clip 14 in place. The ridge 30 of the c-clip 14 provides a snap fit when assembling the c-clip 14 to the supporting bracket 16 through the use of the leaf spring 15 and c-clip support flange 40, as shown in FIGS. 2 and 3. The structural elements of the c-clip 14 and the leaf spring 15 allow the screen to be snapped into place from the front of the completed frame of supporting brackets 16. The supporting brackets 16, when snapped together with the c-clips 14, create a complete frame-like structure around each individual video screen panel 12. Having created a frame, the individually framed video screen panels 12 may be placed together in a grid formation. Pairs of supporting brackets 16 are placed together such that the base surfaces 59 are in contact as shown in FIG. 1a. The grid formation creates the overall video screen presentation shown in FIG. 1.

Figure 5:
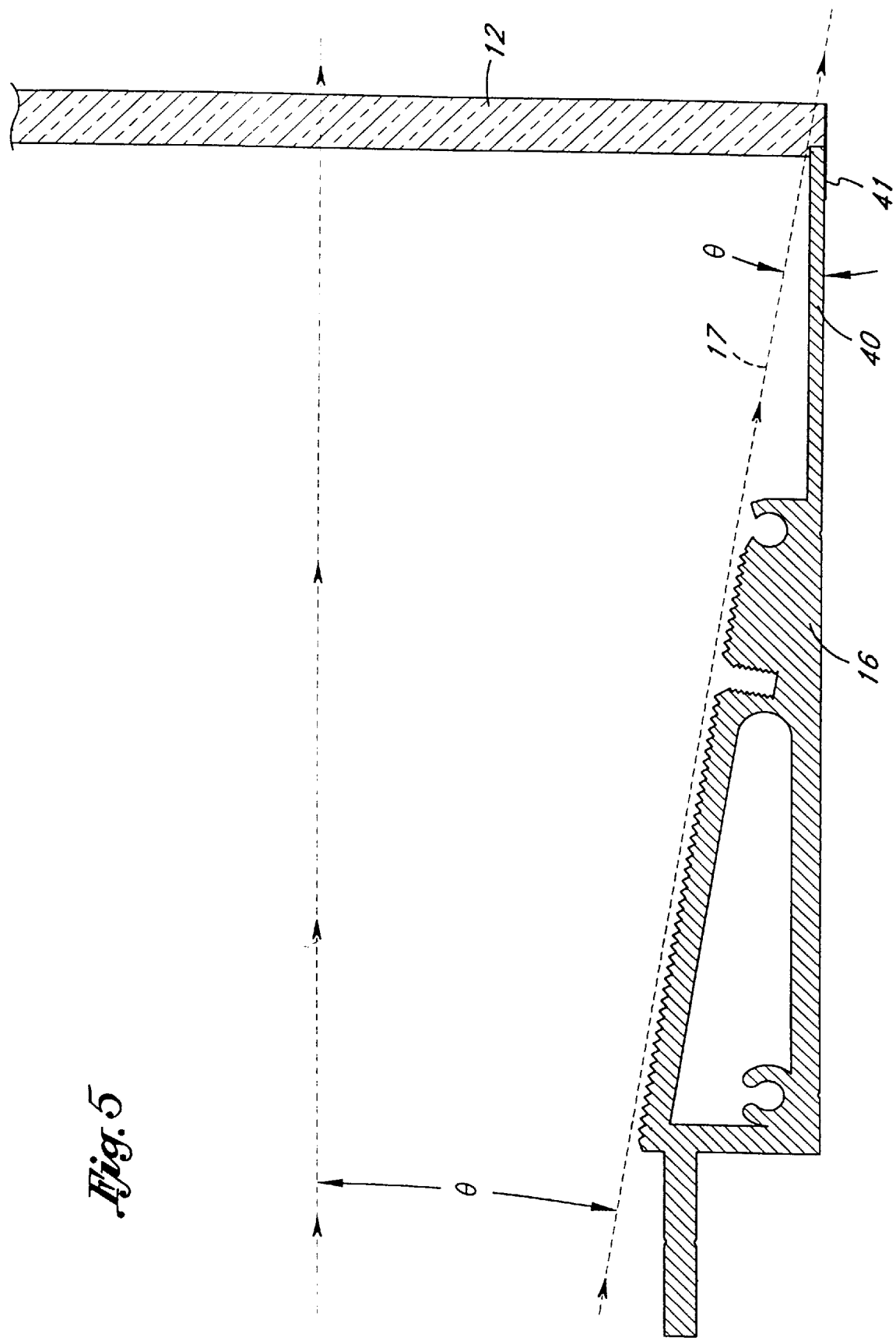
FIG. 5 is a cross-section of a bayonet support method and apparatus.

Referring to FIG. 5, an alternate means of attachment is shown. In the alternate embodiment. the supporting bracket 16 holds the video screen panel 12 in a bayonet manner. The video screen panel 12 is slightly notched on the edges which creates a flush surface with the base surface 59 of the supporting bracket 16 when the c-clip support flange 40 is placed against the notched edge. The c-clip support flanges 40 of four supporting brackets 16, without clear plastic extrusions such as the c-clips 14, support the video screen panels 12 and eliminate the need for the c-clips 14 through the use of mylar tape 41. Adhesive material, such as mylar tape 41 or other suitable adhesive means is then placed along the edge such that it will not appear on the front of the video screen surface. The mylar tape 41 is used to directly adhere the video screen panel 12 to the c-clip support flange 40 of supporting bracket 16. The mylar tape 41 is preferably placed around the entire periphery but at least as needed for support. The frame structure created by the four surrounding supporting brackets 16 can then be placed into a grid formation as discussed above. The bayonet method allows for support of each video screen panel without any grid pattern on the surface of the video screen. Consequently, the bayonet method advantageously provides a substantially continual viewing surface from panel to panel.

Figure 6:
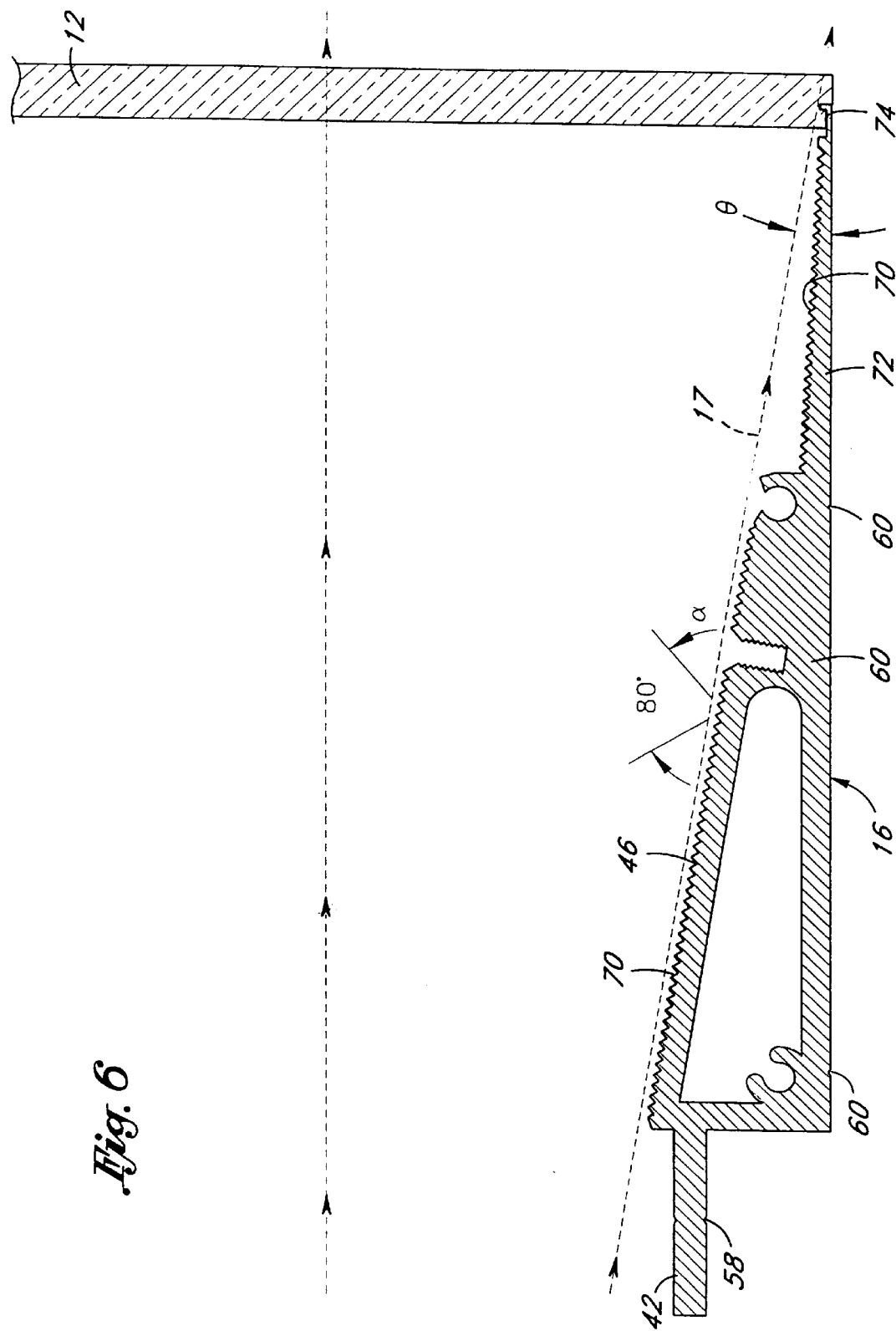
FIG. 6 is a cross-section of a further embodiment of this invention.
Figure 7:
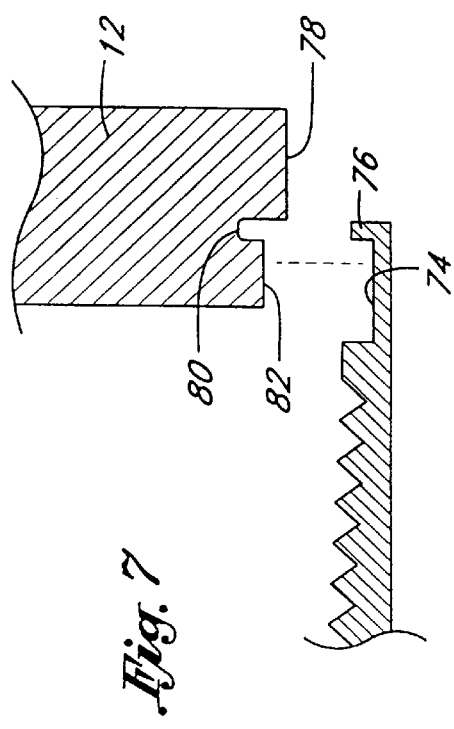
FIG. 7 an enlarged exploded segment of a portion of FIG. 6.

Referring to FIG. 6, a further embodiment of this invention is described in which like numbers refer to like parts as previously described. In this embodiment the support bracket 16 has a plurality of grooves 70 that extend along substantially the entire length of the inside surface of the bracket 16 that is potentially exposed to incident light 17 from the projector. The flat base surface 59 has an interior surface on the end adjacent the screen panel 12 that is tapered to form a tapered support on 72. Grooves 70 are formed along the length of the interior surface of end 72. The grooves 70 advantageously subtend an arc $\alpha$ of about 80°, and are black anodized to further inhibit reflection of light 17 from the image projector onto the screen 12. The grooves 70 extend to the almost the distal end of bracket 16 and end 72.

The support end 72 forms a tongue-in-groove connection with the edge of screen panel 12. Thus, the distal portion of end 72 has a flat strip along the length of the bracket 16 of sufficient size to accommodate a mating notch or ridge 82 of screen panel 12. At the distal end of bracket 16 and end 72 is a ridge, flange or tongue 76 which extends generally perpendicular to the end 72, along the plane of screen panel 12. The flange or tongue 76 extends into a groove 80 formed in the edge of screen panel 12. The groove 80 advantageously extends along the length of one edge of screen panel 12, as opposed to extending through the thickness of the panel 12. Advantageously the groove is formed in each edge of the screen panel 12 to extend around the periphery of the screen panel 12. The flange or tongue 76 engages the groove 80 to form a tongue-in-groove connection with the screen panel 12. Advantageously, the groove 80 is located as close to the interior edge of screen panel 12 as possible while providing sufficient strength to hold the panel 12. By placing the groove 80 toward the interior edge of the panel 12, there is less blockage of the image viewable on the exterior of the screen panel 12. Thus, a notch is formed along the edge, leaving a ridge 78 that extends along the side of flange or tongue 76. The ridge 78 advantageously ends flush with the exterior surface of bracket 16. If desired, a strip of adhesive tape (not shown) can extend over the ridge 78 and a portion of end 72 to further strengthen the connection of the screen panel 12 to the bracket 16. Further, the length of the tongue 76 is advantageously outside the illumination of the projector, so that the tongue 76 does not block any light 17. In some cases it may be necessary to block some small portion of the light 17, but such blockage may be minimized by correct selection of tongue 76.

The bracket 16 is advantageously extruded to form a single piece extrusion that can be cut to various lengths that correspond to the length of the sides of the screen panel 12. Advantageously, the bracket 16 is slightly curved along its length to have a slight camber to urge tongue 76 toward the screen panel 12 at the center of the bracket 16 in order to ensure engagement between the tongue 76 and groove 80. Because the center of the bracket 16 extends more toward the adjacent groove 80 in the edge of panel 12, and because the sides of the panel 12 are typically straight, when installed the bracket 16 will be resiliently deformed to a more straight position. This causes the middle of the bracket 16 to be spring loaded and resiliently urged toward the panel 12. Specifically, tongue 76 is resiliently urged into the groove 80. This resilient engagement ensures the panel 12 is held securely by bracket 16.

Figure 2A:
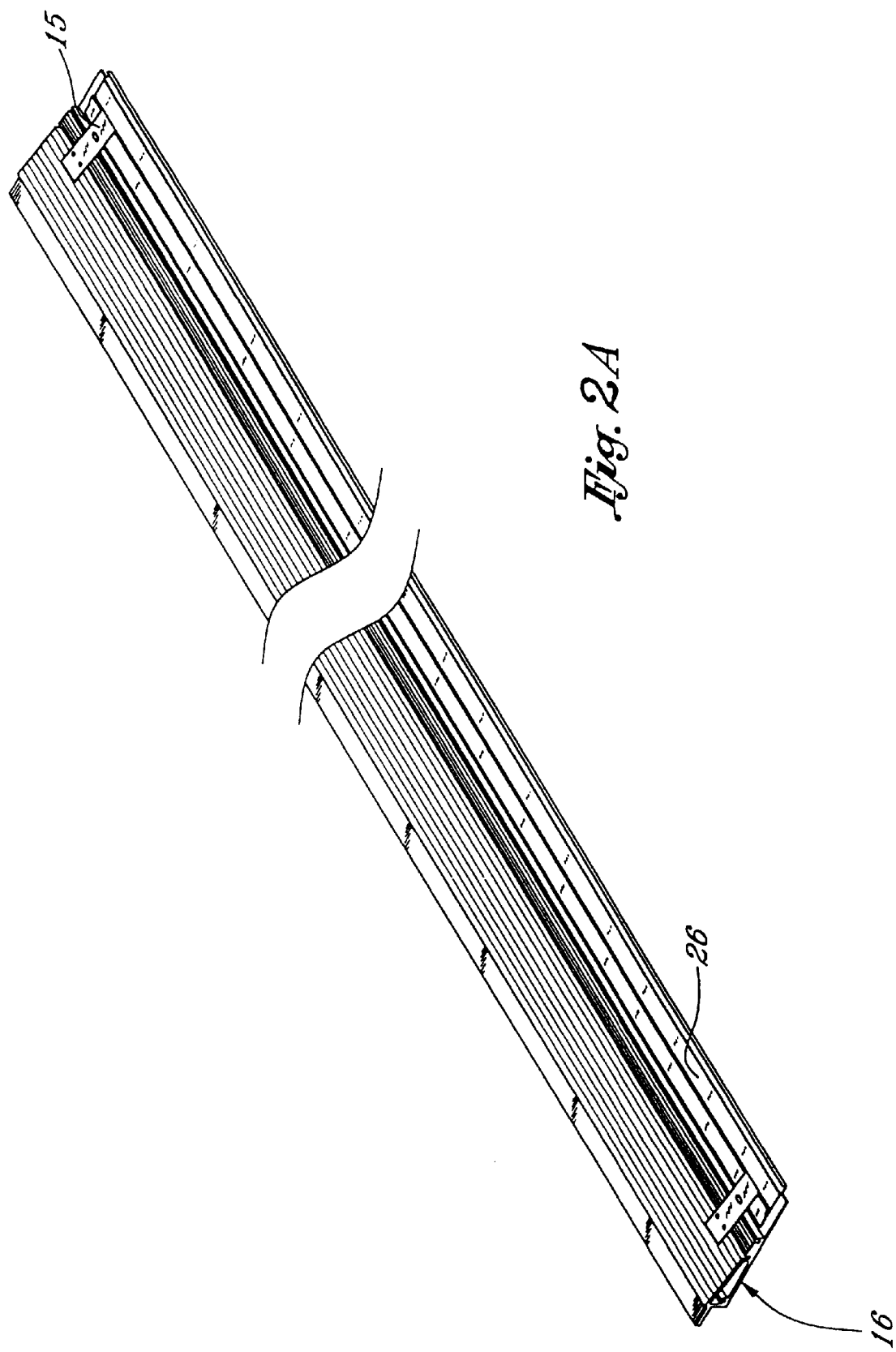

A curve or camber of about 3700 inches radius, or about 300 feet radius, radius (visually indistinguishable from FIG. 2A), is believed suitable. The 300 foot radius camber is large relative to the length of the sides of the screen panel 12 held by bracket 16. The camber is advantageously at least 10 times greater than the length of bracket 16 along a side of the panel 12, and may be 30–80 times greater. This camber is preferably achieved by bending the extruded bracket 16 before heat treatment. The camber could be added after beat treatment but the material is then harder and more energy is required to form the bracket 16. To allow this extrusion while providing suitably hard material for the bracket 16, a 6063T6 aluminum can be used.

When installed, the corners of the bracket 16 may be mitered to form a flush connection surrounding the four sides of screen panel 12. The tongue 76 cooperates with the groove 80 and notches 82, 78 around the periphery of the screen panel 12 in order to restrain movement of the screen panel 12 along the length of the bracket 16, or in a direction perpendicular to the screen panel 12. The end 72 inhibits movement of the screen panel 12 in a direction perpendicular to the end 72, which direction, lies in the plane of screen panel 12. Because the brackets 16 are on four sides of the screen panel 12, the ends 72 restrain movement in the plane of the screen panel 12.

For a screen panel 12 that is about ¼ inch thick, the length of tongue 76 can be as little as about ¹⁄₃₂ inch. The tongue 76 allows images projected on the screen panel 12 to effectively have no border if the screen 12 is thick enough or if the screen 12 is a diffusion screen. For thinner screens or fresnel screens, a slight border on the order of about ⅛ inch may appear. Because the screen panels 12 can be six to ten feet diagonally, the distracting effect of such a slight border is greatly reduced.

The screen panels 12 are held by c-clips 14, ends 40 or flanges 76 that are a small fraction of the screen size, which can be from 6–10 feet diagonally. For example, the legs 23, 24 of c-clips 14 are about 0.125 inches long, while the flange or tongue 76 is about ¹⁄₃₂ inch long (0.03125"). The c-clips 14 or flanges 76 are also small relative to the thickness of the screens 12, which can be from about 0.25 inches thick on up for larger screens 12. Indeed, the tongue-in-groove connection uses a flange that is about ¼ or less the thickness of screen 12, and preferably less than ¹⁄₁₆ the thickness of screen 12. The c-clips 14 or flanges 76 are also less than half the thickness of the wedge-shaped bracket 16, as the thickness of the bracket at the short side 44 is much more than twice the length of flange 76 or clip 14. Advantageously, the dimensions of the inwardly extending portions of the flanges 23, 24, 76 are also selected to reduce blockage of the image projected on the screen panel 12, and advantageously are selected to minimize such blockage, and more advantageously are selected to avoid such blockage.

There is thus provided an apparatus and method for holding a display screen onto which an image is projected from a light source that diverges toward the screen 12 at an angle of θ. This is achieved by placing a notch 82 along an edge of the screen 12 and forming a groove 80 in the edge of the screen at the end of the notch that is interior to the screen. A support bracket 16 is formed to have a first end and also a distal end that has a flange 76 thereon sized to engage the notch 82 and groove 80 when flange is placed in contact with the notch and groove. The bracket 16 is then fastened to a support structure 18. It is possible that the notch 82 can be eliminated, and the flange 76 just engage the groove 80.

Advantageously, the depth of the groove 80 is selected so that it does not block light from the image projected onto the screen 12. It may be necessary to have the groove 80 deep enough that it distorts or blocks some portion of the image projected onto screen 12, but his blockage or distortion can be minimized by proper selection of the depth of groove 80. While the flange 76 and bracket 16 are advantageously of metal, it is believed possible that the flange 76 could be made of clear plastic to further lessen the blockage of light onto the screen 12. The interior surface on the bracket 16 is advantageously inclined at an angle of about θ or smaller so the interior surface does not block the light from the projected image.

The bracket 16 of this embodiment no longer has the leaf springs 15 (FIG. 8) and thus does not necessarily need the grooved slot 36 that accommodated screws 32 to hold the springs 15. But the grooved slot 36 can also be used to hold screws that fasten "L" shaped corner support bracket to form a mitered corner where each leg of the bracket is fastened to an adjacent, but different bracket 16, with screws extending into the grooved slots 36 of those different brackets 16.

Figure 8:
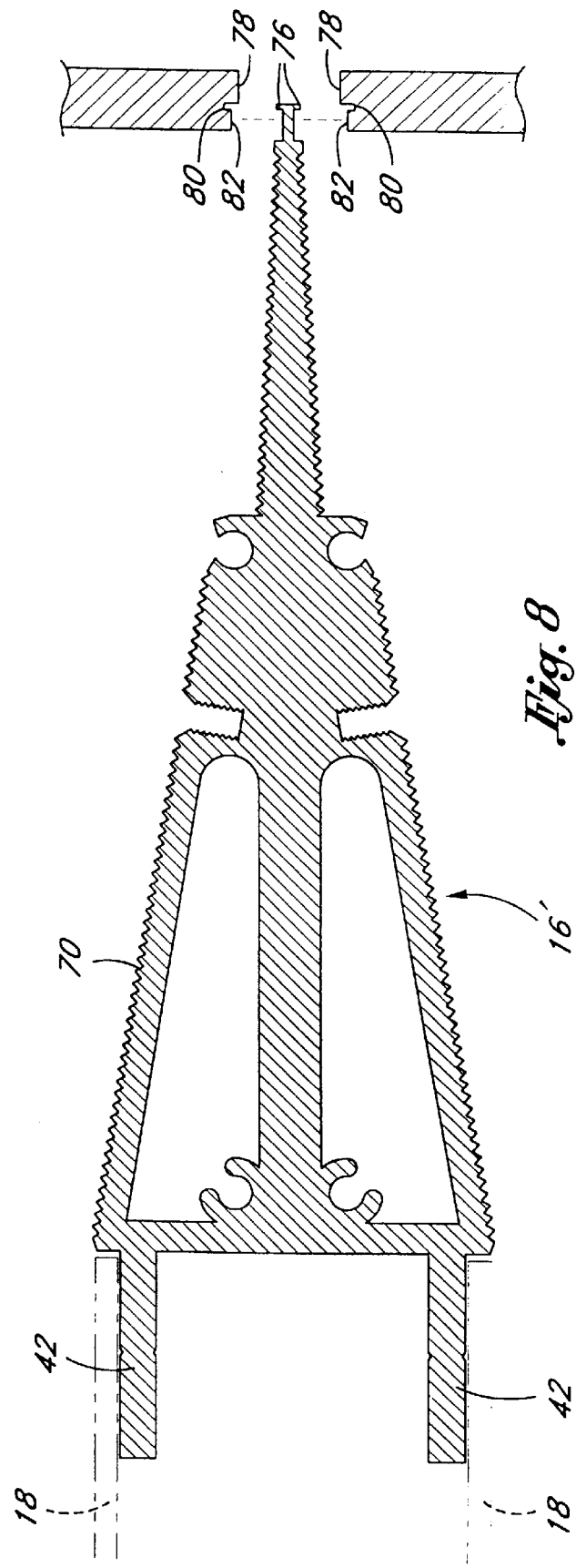
FIG. 8 is a cross-section of a further embodiment of this invention.

Referring to FIG. 8, yet another embodiment is shown in which the distal end of bracket 16' terminates in a "T" section comprising opposing flanges 76. The brackets 16 typically abut each other at the interior of the screen display as shown in FIG. 1a, with the brackets 16 being placed so the respective base surfaces 59 of each bracket 16 are abutting each other, or back-to-back. The embodiment of FIG. 8 combines two brackets 16 into a single bracket 16' that is symmetric about a longitudinal plane through the length of the bracket 16'. Similar brackets 16 may be formed by combining the configurations shown in FIGS. 3 and 5.

The foregoing description of the present invention is explanatory thereof and various changes in the size, or shape, as well as on the details of the illustrated construction may be made within the scope of the appended claims without departing from the spirit of the invention. Various modifications of the disclosed embodiments as well as alternative applications of the invention will be suggested to persons skilled in the art by the foregoing specification and illustrations. It is therefore contemplated that the appended claims will cover such modifications, applications or embodiments as fall within the true scope of the invention.

I claim:

1. An apparatus for holding a video display screen that projects an image on to the screen at an angle of about θ, the screen having a groove in a plurality of edges of the screen, comprising:

an elongated holding bracket having a substantially uniform cross-sectional shape along substantially the entire length of the bracket, the cross-sectional shape having a thicker first end and a smaller second end to form a generally triangular closed shape having three sides and further having a mounting surface for connecting the bracket to a support structure, the cross-sectional shape having an exterior side and an interior side with the interior side being inclined at an angle θ of about ten degrees or less, the second end terminating in a support flange extending from the second end away from the first end, the first end having a c-clip cooperating with said groove in said screen to hold the screen during use of the bracket, the bracket's length being substantially greater than its width with the width being measured between the first and second ends, the c-clip having an interior surface and an exterior surface, the clip having a distal end extending beyond the second end of the bracket, the distal end of the clip having opposing legs extending from the interior surface, the flange extending a distance selected to reduce blockage of the image projected on the screen when the bracket is fastened to the screen, the legs being spaced apart to receive and hold the screen when the bracket is fastened to the screen, the clip being fastened to the interior of the bracket.

2. An apparatus for holding a video display screen onto which an image is projected by a projector, the apparatus being in combination with the screen, comprising:

a video display screen having a plurality of edges;

at least two elongated holding brackets each of which extends along and is fastened to a different one of the plurality of edges, each of the brackets having a cross-sectional shape with a thicker first end and a smaller second end along a width of the brackets that converge at an angle selected to avoid blocking the image from the projector during use of the display screen and with the second end closer to the screen than the first end, the brackets having an anti-reflective surface on an interior surface of the bracket to avoid reflection onto the screen, the brackets having a mounting surface for connecting to a support structure when in use, each of the brackets having a center that is slightly bent toward the screen relative to ends of the bracket, and a c-clip having an interior surface and an exterior surface, the clip having a distal end extending beyond the second end of the bracket, the distal end of the clip having opposing legs that are spaced apart a distance sufficient to receive and hold the screen with the legs extending toward the screen a distance less than the distance by which the legs are spaced apart.

3. An apparatus for holding a video display screen having a plurality of edges and defining a periphery, the image being projected on to the screen at an angle, comprising:

a plurality of elongated holding brackets having a substantially uniform cross-sectional shape that has a thicker first end and a smaller second end to form a generally triangular closed shaped having three sides and converging toward the second end, at least some of the brackets further having a mounting surface for connecting to a support structure, the cross-sectional shape having an exterior side and an interior side with the interior side being inclined at an angle selected to avoid blocking the projected image, each bracket having a distal end at the second end adapted to hold an adjacent edge of the screen from movement in at least one direction when the bracket is connected to the screen, the brackets being configured to be placed around the periphery of the screen to hold the screen in position during use of the brackets, and wherein the distal end comprises a pair of flanges configured to be placed on opposing sides of the screen to hold the screen between the flanges during use of the brackets, the flanges being spaced apart a distance selected to correspond to a thickness of the screen and one of the flanges extending a distance less than the thickness of the screen.

4. An apparatus as defined in claim 3, wherein the interior side has an anti-reflective surface to reduce the reflection of light on the screen during use of the bracket.

5. An apparatus as defined in claim 3, wherein the brackets cooperate with the edges of the screen to hold the screen.

* * * * *